United States Patent [19]
Capps

[11] Patent Number: 5,634,102
[45] Date of Patent: May 27, 1997

[54] METHODS AND APPARATUS FOR A SELECTABLE BACKDROP

[75] Inventor: Stephen P. Capps, San Carlos, Calif.

[73] Assignee: Apple Computer, Inc., Cupertino, Calif.

[21] Appl. No.: 517,498

[22] Filed: Aug. 7, 1995

[51] Int. Cl.$^6$ ........................................ G06F 3/00
[52] U.S. Cl. .................. 395/334; 395/333; 395/653
[58] Field of Search ............................ 395/155–161, 395/650, 700

[56] References Cited

U.S. PATENT DOCUMENTS

| | | | |
|---|---|---|---|
| 5,530,795 | 6/1996 | Wan ............................... | 395/158 X |
| 5,530,858 | 6/1996 | Stanley et al. ................. | 395/650 |
| 5,551,033 | 8/1996 | Foster et al. .................. | 395/650 |

*Primary Examiner*—Raymond J. Bayerl
*Assistant Examiner*—A. Katbab
*Attorney, Agent, or Firm*—Hickman Beyer & Weaver

[57] ABSTRACT

A method, in a digital computer having a display screen, for executing an application program in a backdrop mode that makes the application program non-removable from the display screen. The method includes the steps of designating the application program for execution in the backdrop mode and executing the application program. Further, the method includes the step of intercepting, using substitute subroutines external to the application program, selected data destined for the application program. The interception advantageously prevents the application program from responding to the selected data in a manner normally expected of the application program if the application program executes in a non-backdrop mode. The selected data that is intercepted includes data for causing the application program to quit execution. Further, the method also includes the step of disabling a close option in the display screen to prevent a user of the digital computer from issuing a command to quit execution of the application program while the application program executes in the backdrop mode. In this manner, the method permits codes in the application program to remain substantially unchanged irrespective of whether the application program executes in the non-backdrop mode or in the backdrop mode.

17 Claims, 12 Drawing Sheets select calls steps to make backdrop confirmation calls as backdrop

METHODS AND APPARATUS FOR A SELECTABLE BACKDROP

BACKGROUND OF THE INVENTION

The present invention relates generally to computer systems, and more particularly to methods and apparatus for making an application program into a display screen backdrop for digital computer systems.

Computers are becoming increasingly powerful, lightweight, and portable. The computing power of computers that once filled entire rooms is now residing on a desktop. Laptop, notebook, and sub-notebook computers are virtually as powerful as their desktop counterparts. Even smaller hand-held computers are now capable of computing tasks that required much larger machines a few short years ago.

As a part of this trend, computerized personal organizers are becoming increasingly popular with a large segment of the population. Computerized personal organizers tend to be small, lightweight, and relatively inexpensive, and can perform such functions as keeping a calendar, an address book, a to-do list, etc. While many of these functions can also be provided in conventional computer systems, personal organizers are very well suited to the personal organization task due to their small size and portability. Personal organizers are available from many companies including Sharp and Casio of Japan.

A relatively new form of computer, the pen-based computer system, holds forth the promise of a marriage of the power of a general purpose computer with the functionality and small size of a personal organizer. An example of a pen-based computer system is the Newton® 120 pen-based computer made and marketed by Apple Computer, Inc. of Cupertino, Calif.

A pen-based computer system is typically a small, hand-held computer where the primary method for inputting data includes a "pen" or stylus. A pen-based computer system is commonly housed in a generally rectangular enclosure, and is provided with a dual-function display assembly that can serve as both an input device and an output device. When operating as an input device or "tablet", the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function display assemblies of pen-based computer systems permit users to operate the computer as a computerized notepad, among other functions. For example, graphical images can be input into the pen-based computer by merely moving the stylus on the surface of the screen. As the CPU senses the position and movement of the stylus, it generates a corresponding image on the screen to create the illusion that the stylus is drawing the image directly upon the screen, i.e. that the stylus is "inking" an image on the screen. By "ink" it is meant that pixels on the screen are activated in such a manner that it appears that the stylus is leaving a trail of ink on the display assembly. With suitable recognition software, the "ink" can be recognized to input text, numerics, graphics, and other recognized information into the pen-based system.

On some digital computers, particularly those that are small and highly portable such as the aforementioned Newton®, there is provided a type of program known as the backdrop. A backdrop, as implied by its name, serves as the one piece of software that always operates in the background irrespective of how many other pieces of software the computer may be executing at any given moment. A backdrop can provide any function provided by the typical and familiar stand-alone application software yet differs therefrom in many important respects. For one, there is only one backdrop open (executing) on a computer at any given moment. Further, the backdrop is always open and available to the user whenever the computer is powered on. Most significantly, the execution of a backdrop preferably cannot be terminated by a user or by any other programs since backdrops derive their usefulness from, among others, their ability to remain around as long as the computer is on.

These features make backdrops user-friendly and popular with some users. To illustrate, a computer user who is a real estate agent may desire to have her Newton® always executing her address book program. By having an address book backdrop, it is assured that the address book data is always available to her whenever her Newton® is on irrespective of whether additional application programs are launched at a later time.

Further, a backdrop program may be set to be automatically launched when the computer is turned on. By choosing the suitable backdrop application, a user can essentially have a computer that appears to be dedicated to running the chosen backdrop application at all times from the moment it is turned on. These feature turns the computer into a highly functional tool for certain users, particularly those who depend heavily on a single application program for a majority of the time, e.g., the real estate agent in the above example.

As is known, software is written to be either a stand-alone application, e.g., one that is executed using traditional and known methods of launching an application program or as the backdrop. As it turns out, more software is written as stand-alone applications than as backdrops. When a given software is designed as a stand-alone application program, it lacks certain attributes of a backdrop, i.e., the ability to resist termination by the user or by another program, behaviors associated with being the background application instead of just another application window, the ability to self-launch from the moment the computer is turned on, and so forth.

In the prior art, if the user purchased a stand-alone application program, it is not possible at a later date to easily convert that stand-alone application program into the backdrop once the user develops a sufficient liking to and dependence on the application program and would like to have it open at all times. This is because prior art techniques require that the codes of the stand-alone application program be rewritten to endow it with backdrop attributes in order to accomplish the conversion. As can be appreciated, this approach requires intimate knowledge of programming techniques as well as details regarding how the original application program is coded, and is impractical for all but the most skilled programming professionals.

In view of the above, what is desired is an improved method and apparatus for converting an application program into the backdrop in a simple, user-friendly manner. Further, it is desirable that the conversion be performed without rewriting the codes of the original application program. Further, it is desirable that the conversion be seamless, permitting the user to designate a given application program to execute either in the backdrop mode or the non-backdrop mode with minimum effort.

SUMMARY OF THE INVENTION

The present invention relates in one embodiment to a method, in a digital computer having a display screen, for executing an application program in a backdrop mode that makes the application program non-removable from the display screen. The method includes the steps of designating the application program for execution in the backdrop mode and executing the application program. Further, the method includes the step of intercepting, using substitute subroutines external to the application program, selected data destined for the application program. The interception advantageously prevents the application program from responding to the selected data in a manner normally expected of the application program if the application program executes in a non-backdrop mode. In accordance with this embodiment, the selected data which is intercepted includes data for causing the application program to quit execution.

Further, the method also includes the step of disabling a close option in the display screen to prevent a user of the digital computer from issuing a command to quit execution of the application program while the application program executes in the backdrop mode. Advantageously, the method permits codes in the application program to remain substantially unchanged irrespective of whether the application program executes in the non-backdrop mode or in the backdrop mode.

In another embodiment, the method further includes the step of disabling the close option includes the step of visually removing a user-selectable close icon from the display screen.

In yet another embodiment, the selected data which is intercepted includes data regarding window floating. Because they are intercepted by the substitute subroutines, the data regarding window floating does not reach the original routines in the application program. Advantageously, this interception causes the application program to always remain in the display screen visual background when the application program is executed in the backdrop mode.

In yet another embodiment, the step of intercepting in the inventive method includes the step of enabling the substitute subroutines in a context frame associated with the application program when the application program is executed in the backdrop mode.

In yet another embodiment, the invention relates to a digital computer having a display screen for executing an application program in a backdrop mode that makes the application program non-removable from the display screen. The digital computer includes means for designating the application program for execution in the backdrop mode and means for executing the application program. Further, the digital computer includes means for intercepting, using substitute subroutines external to the application program, selected data destined for the application program. The interception advantageously prevents the application program from responding to the selected data in a manner normally expected of the application program if the application program executes in a non-backdrop mode. In accordance with this embodiment, the selected data includes data for causing the application program to quit execution.

Further, the digital computer includes means for disabling a close option in the display screen to prevent a user of the digital computer from issuing a command to quit execution of the application program while the application program executes in the backdrop mode. The digital computer advantageously permits codes in the application program to remain substantially unchanged irrespective of whether the application program executes in the non-backdrop mode or in the backdrop mode.

These and other advantages of the present invention will become apparent upon reading the following detailed descriptions and studying the various figures of the drawings.

Detailed Description of the Preferred Embodiments

The present invention is well suited for pointer based computer systems such as the pen-based, pen-aware, mouse, track ball, and track pad controlled systems that are currently popular. For the purposes of illustration, the invention will be described in connection with a pen-based system.

Figure 1:
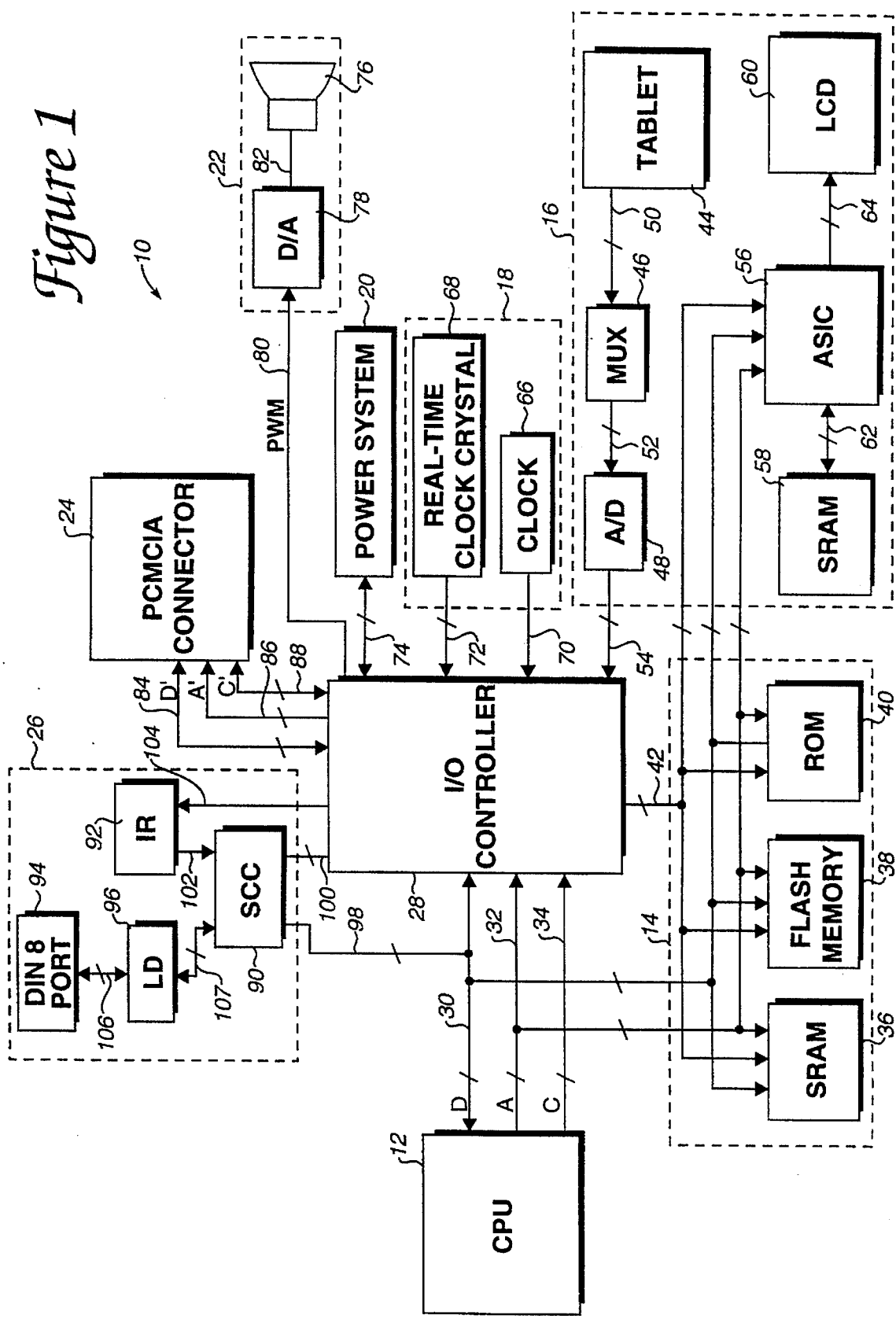
FIG. 1 is a block diagram of the electronics of a pen-based computer system in accordance with the present invention.

As shown in FIG. 1, a block diagram 10 of the electronics of a pen-based computer in accordance with the present invention includes a central processing unit (CPU) 12, a memory system 14, an input/output (I/O) dual function display system 16, a clock system 18, a power system 20, a sound system 22, a PCMCIA connector 24, and a serial I/O system 26. The various components and systems of the computer 10 are coupled together by an I/O controller 28 which serves as an interface between the CPU 12 and other components of the computer 10. More specifically, the I/O controller 28 is an application-specific integrated circuit (ASIC) designed to handle memory, peripherals, and I/O tasks, as well as housekeeping functions such as providing system clocks, controlling power usage, etc. The design, manufacture, and use of ASICs is well known to those skilled in the art. The pen-based computer 10 as illustrated is currently being manufactured and sold by Apple Computer, Inc. of Cupertino, Calif. as a Newton® 120 Personal Digital Assistant (PDA).

CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. In the present embodiment, the CPU 12 is preferably an ARM® 610 RISC chip operating at 20 megahertz and is available from a variety of sources including VLSI Technology, Inc. of San Jose, Calif. and Plessey Semiconductor of England. The present CPU 12 includes a 32 bit data (D) bus 30, a 32 bit address (A) bus 32, and an 8 bit control (C) bus 34.

The memory system 14 includes static random access memory (SRAM) 36, non-volatile read/write "flash" memory 38, and read-only memory (ROM) 40. The SRAM 36 serves as volatile "scratch pad" memory for the computer system 10 and, in the current system, includes 512 kilobytes of memory. The flash memory 38 is where user data is stored, preferably includes about 2 megabytes of memory, and is available as a standard product from Intel Corporation of Santa Clara, Calif. The ROM 40 stores the operating system and embedded application programs, and currently comprises approximately 8 megabytes of memory. Of course, there are many equivalents for the SRAM 36, flash memory 38, and ROM 40. For example, dynamic random access memory (DRAM) can be substituted for SRAM 36, battery-backed random accessed memory (RAM) can be substituted for flash memory 38, and a programmable read-only memory (PROM) can be substituted for the ROM 40.

The memory system 14 is coupled directly to the data (D) bus 30 and the address (A) bus 32. The memory system 14 is also coupled to a memory control bus 42 of controller 28. The CPU 12 and controller 28 cooperate to read and write data to the memory system 14 via the busses 30, 32, and 42.

The display system 16 serves as both an input device and an output device. More particularly, a tablet 44, multiplexer (MUX) 46, and analog-to-digital (A/D) converter 48 convert the contact of a stylus (see FIG. 2) with the tablet 44 and its subsequent movement over the tablet into digital data that is input to the controller 28. The tablet 44 is preferably a four-wire resistive membrane tablet and provides positional information on a bus 50 which is input into the MUX 46. The MUX 46 determines which of the four sides of the tablet is to be read. Such tablets are widely available from a variety of sources including Nissha of Japan. An output from the MUX 46 is input to A/D converter 48 on a bus 52. An output from the A/D converter 48 is input into the controller 28.

The display system 16 further includes an ASIC 56, a dedicated SRAM 58, and an LCD screen 60. The ASIC 56 is an LCD controller coupled to the data (D) bus 30, the address (A) bus 32, and the memory control bus 42. The purpose of the ASIC 56 is to allow the CPU 12 to write to the screen as if it were a RAM sitting on the memory bus 42. The SRAM 58 is coupled to the ASIC 56 by a dedicated bus 62, and the screen 60 is coupled to the ASIC 56 by a dedicated bus 64. The ASIC 56 serves as a controller for the screen 60, and uses the SRAM 58 as a frame buffer to store images to be displayed on the screen 60. The LCD screen 60 is preferably a standard super-twist LCD matrix screen available from a number of sources including Seiko-Epson of Japan. The LCD screen preferably comprises a rectangular array of picture elements or "pixels", as is well known to those skilled in the art.

The clock system 18 includes a main system clock 66 and a real-time clock (RTC) crystal 68. The main system clock is a four-terminal oscillator and is used to provide the master clock for the computer 10. In the present embodiment, the main system clock 66 operates at 40 megahertz. Oscillator clocks such as clock 66 can be commercially obtained from many sources including Seiko-Epson of Japan. This master clock may be divided down by the controller 28 for various timing purposes in the system, and is coupled to the controller 28 by a line 70.

The RTC crystal 68 is tuned to 32.768 kilohertz, which is evenly divisible by a power of 2. The RTC crystal 68 forms the basis of a crystal based oscillator that can provide a continuous, precise, uninterrupted signal at 1 hertz by dividing down the 32.768 kilohertz crystal signal with a 10 bit divider. The circuitry for performing this type of task is well-known, and form a part of controller 28 in this embodiment. The one hertz RTC signal increments a RTC counter (also a part of the controller 28) to count of the total number of seconds that has elapsed since midnight, Jan. 1, 1904 (an arbitrary start time). The value in the RTC counter can be converted into time of day and date information by relatively straight-forward calculations well known to those skilled in the art. Since the RTC crystal 68 is coupled to the controller 28 by a dedicated two-line bus 72 to provide the 32.768 kilohertz signal to the controller 28.

The power system 20 provides power to the computer 10 and is coupled to the controller 28 by a dedicated bi-directional bus 74. The bus 74 allows for the handling of fault detection signals (e.g. low power), switching on and off power to the PCMCIA connector, etc. The power system 20 preferably controls the power system 20 to conserve power at times of low usage of the pen-based computer system.

The sound system 22 includes a small (18 mm diameter) loudspeaker 76 and a D/A converter 78. The D/A converter 78 is coupled to the controller 28 by a line 80, and to the loudspeaker 76 by a line 82. In the present embodiment, the D/A converter 78 is a simple operational amplifier (OP AMP) which acts as an integrator to integrate pulse width modulation (PWM) signals developed on line 80 to provide an analog signal on line 82 to drive loudspeaker 76. Of course, more complex D/A converters can also be used to provide higher quality sound output from loudspeaker 76, as will be apparent to those skilled in the art. Suitable OP AMPS to be used as a D/A converter 78 are readily available on the commercial market, and the miniature loudspeaker is also readily available, such as from Hosiden of Osaka, Japan.

The PCMCIA connector 24 is coupled to the controller 28 by a dedicated data (D') bus 84, a dedicated address (A') bus 86, and a dedicated control (C') bus 88. The PCMCIA specifications for signals on the dedicated data, address, and control busses are industry standard and highly available as the "PC Card" or "PCMCIA" standard. A variety of devices can fit in the PCMCIA slot 24, including memory expansion cards, miniature hard disk drive cards, modem cards, and pager cards, to name a few.

The serial I/O system 26 includes a Serial Communications Controller (SCC) 90, an infrared (IR) transceiver 92, a serial port 94, and a line driver (LD) 96. The SCC 90 is coupled to the data bus (D) 30 by a bus 98 and to the controller 28 by a bus 100. A suitable SCC 90 can be purchased from Zilog Corporation of San Jose, Calif. as part number Z85C30. The Zilog Z85C30 has been available since at least the early 1980's and supports a number of serial protocols. The IR transceiver 92 is coupled to the SCC 90 by a line 102 for received IR signals, and to the controller 28 for IR signals to be transmitted. The IR transceiver includes an IR transmitter (coupled to line 104) and an IR receiver (coupled to line 102), and is available under license from Sharp Corporation of Japan. The IR receiver includes a PIN-type IR-sensitive diode having an output coupled to an analog demodulator and an amplifier to create a signal on line 102, an IR LED coupled to line 104 to be directly driven by a high-power switch of controller 28. The serial port 94 is a standard DIN 8 (8 pin) connector, and is coupled to the line driver LD 96 by an eight bit bus 106. The LD 96 is coupled to the SCC 90 by a bus 107.

Figure 2:
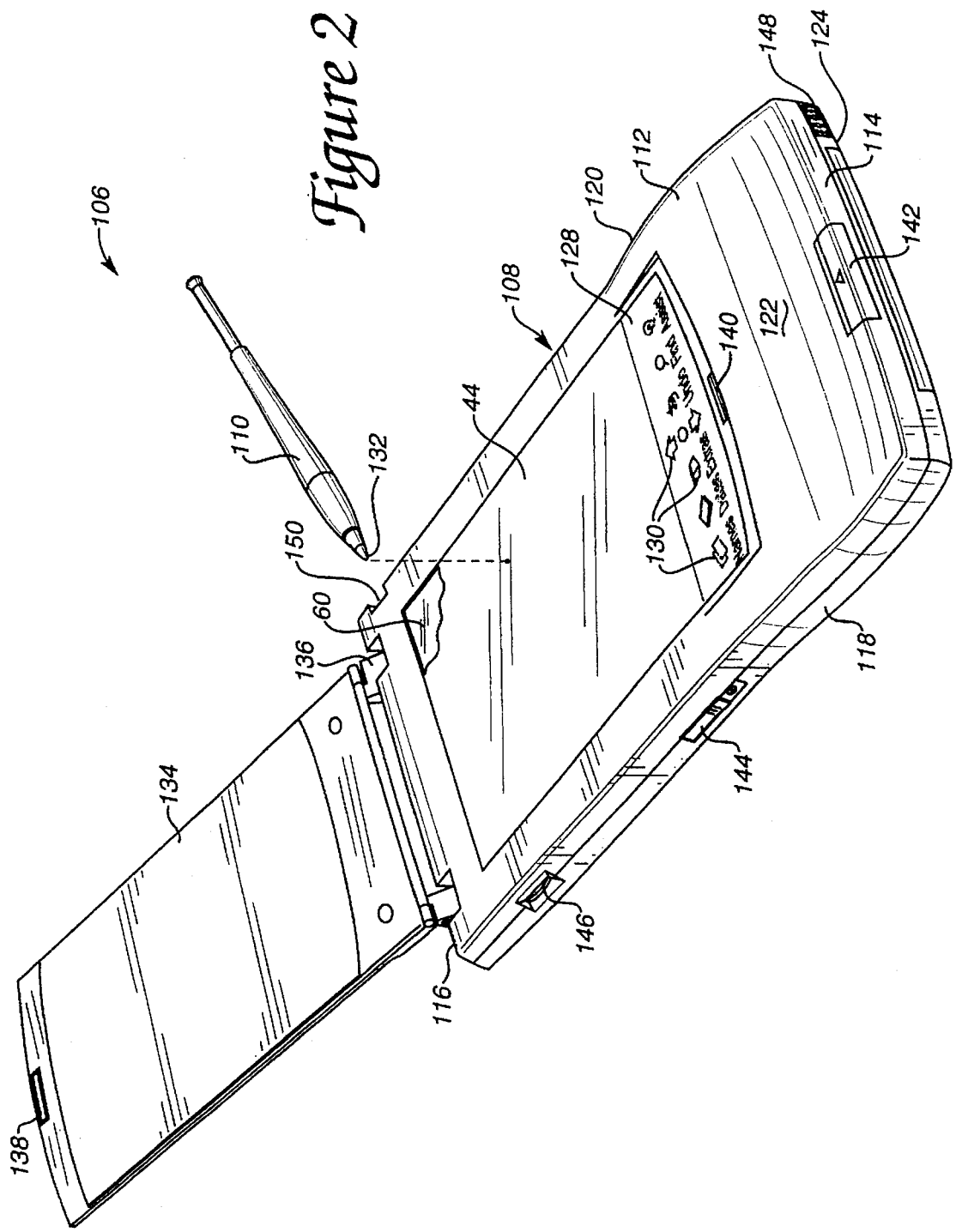
FIG. 2 is a perspective view of a complete pen-based computer system including a housing, display assembly, and stylus, where the electronics of FIG. 1 are enclosed within the housing.

Referring now to FIG. 2, a pen based computer system 106 in accordance with the present invention includes the computer 108 and a pen or stylus 110. The computer 108 is enclosed within a generally flat, rectangular case 112 having a front end 114, a back end 116, a left side 118, a right side 120, a top 122, and a bottom 124. The LCD 60 is positioned along the top 122 of the case 112, and the clear membrane tablet 44 is positioned over the LCD 60. Also positioned beneath the tablet 44 along a lower edge 126 thereof, is a printed strip of material 128 including a number of indicia 130. When the tip 132 of the stylus 110 is engaged with the membrane 44 over one of the indicia 130, the computer 108 can respond to the contact as if the indicia were a "button." Therefore, as used herein, a "button" can be an image seen through the tablet 44 (either from the screen 60 or from primed material 128 or the like) that can serve the function of an electro-mechanical button or the like when the tablet 44 is activated over a button image.

A lid 134 is connected to the back end 116 of case 112 by hinge 136. When open as shown or folded back to contact the bottom 124 of case 112, the tablet 44 and screen 60 are available for use. When the cover 134 is folded over the top 122 of case 112, it fully covers the tablet 44 to protect the delicate membrane material. The lid 134 is provided with a latch member 138 which engages a latch member 140 when it is overlying the top 122 of the computer. The latch member 138 is disengaged from the latch member 140 by a mechanical latch release 142.

Also seen in FIG. 2 is an "on" switch 144, a contrast adjustment 146, and a grille 148 for the speaker 76. The stylus 110 is of a collapsible design and can fit into an opening 150 along the right side 120 of case 112. Not seen in this figure along the right side 120 of the case 112 is an opening for a PCMCIA card which can engage PCMCIA connector 24, the DIN 8 port 94, and a power input jack. Not seen along the bottom 124 of the case 112 is a battery access cover and a mechanical ejection button for a PCMCIA card engaged with the PCMCIA connector 24. The IR port 92 is provided along back 116 of the case 112 and is exposed for use when the cover 134 is folded against the bottom 124 of the case 112. The remaining components and systems of the computer block diagram 10 of FIG. 1 are enclosed within the case 112 of the computer system 108.

It should be noted that the preceding discussion is of a preferred embodiment of the present invention, and that there are many alternatives for the stylus 110. For example, a fingernail or other pointed object could be used with the tablet 44 of the present invention. Also, there are other types of tablets available that utilize other types of styluses.

Other types of pointing devices can also be used in conjunction with the present invention. While the method of the present invention is described in the context of a pen-based system, other pointing devices such as a computer mouse, a track ball, a track pad, a tablet, etc. can be used to manipulate a pointer on a screen of a general purpose computer. Therefore, as used herein, the terms "pointer", "pointing device", "pointing apparatus", "pointing means", and the like will refer to any mechanism, device, or system for designating to a particular location on a screen of a computer display.

Figure 3:
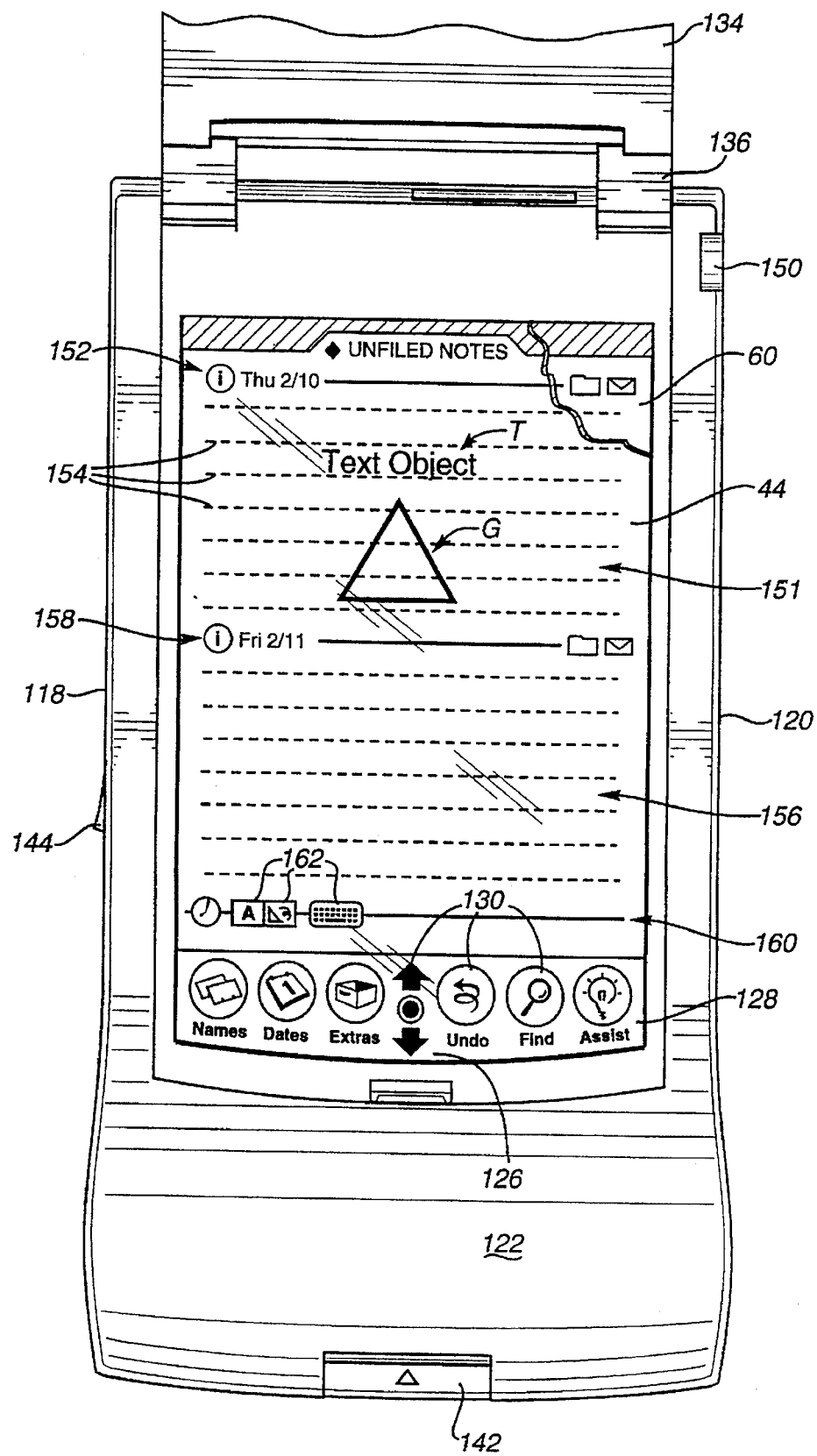
FIG. 3 is a top plan view of the housing and display assembly of pen-based computer system of FIG. 2.

With additional reference to FIG. 3, information is input into the pen-based computer system by "writing" on the tablet 44 with stylus 110 or the like. Information concerning the location of the tip 132 of stylus 110 on the tablet 44 of the display system 16 is input into the CPU 12 via the controller 28. Typically, this information comprises the Cartesian (i.e. x & y) coordinates of a pixel of the screen 60 over which the tip 132 of the stylus 110 is positioned. The CPU 12 then processes the data under control of an operating system (stored in ROM 40) and possibly an application program stored in the memory system 14 or elsewhere (such as on a PCMCIA card engaged with PCMCIA connector 24). The CPU 12 next produces data which is transferred to the screen 60 via ASIC 56 to produce appropriate images on the screen.

Upon power-up, pen based computer system 106 displays on screen 60 an initial "note" area 151 including a header bar 152 and a number of guidelines 154. The header bar 152 preferably includes the date of creation of the note area 151 and a number of icons and "soft" buttons, not particularly germane to the discussion of the present invention. The guidelines 154 aid a user in entering text, graphics, and data into the pen-based computer system 106. A text object T of the text "Text Object" and a graphic object G of a triangle are shown as being entered within note area 151.

Additional note areas, such as a second note area 156, can be formed by the user by drawing a substantially horizontal line across the tablet 44 with the stylus 110. The substantially horizontal line is recognized by the computer system 106 and is converted into a second header bar 158. Additional text, graphical, and other data can then be entered into this second note area 156.

The screen illustrated in FIG. 3 is referred to as the "notepad", and is preferably an application program running under the operating system of the pen based computer system 10. In this preferred embodiment, the notepad is a special or "base" application which is usually or normally available beneath higher level applications. The notepad application, like other applications, run within a window, which in this instance comprises the entire screen 60. Therefore, as used herein, a "window" is the entire screen or any portion of an entire screen which is dedicated to a particular application program. A description of the operation and use of the notepad can be found in U.S. Pat. No. 5,398,310, assigned to the assignee of the present invention, and incorporated herein by reference.

A status bar 160 is provided at the bottom of the notepad application. The status bar 160 is provided with a number of active areas and a number of display areas, which again are not particularly germane to the present invention and will therefore not be discussed in detail herein.

The term "object" will be used extensively in the following discussions. As is well known to software developers, an "object" is a logical software unit comprising data and processes which give it capabilities and attributes. For example, an object can be queried as to its type and can return such data as the number of words that it contains, what its bounding box (BBOX) is, etc. Objects can contain other objects of the same or of a different type. Objects can also be used to project images on a screen according to their object type. Example of object types used in the following description include paragraph, line, and word objects. There are many well known texts which describe object oriented programming. See, for example, *Object Oriented Programming for the Macintosh*, by Kurt J. Schmucher, Hayden Book Company, 1986.

In the present invention, objects may be implemented as part of a frame system that comprises frame objects related by a semantic network. A description of semantic networks can be found in "A Fundamental Tradeoff in Knowledge Representation and Reasoning", *Readings in Knowledge Representation*, by Brachman and Leveseque, Morgan Kaufman, San Mateo, 1985.

It will be noted there is a liberal use of graphic elements in the present invention. For example, the header bars 152 and 158 include lines and other graphical elements. Processes for drawing lines on a computer screen are well known to those skilled in the art. For example, graphics software such as QUICKDRAW from Apple Computer, Inc. of Cupertino, Calif. can be used to draw lines, simple geometrical shapes, etc. A description of the QUICKDRAW graphics software is found in the book *Inside Macintosh, Volumes I, II, and III*, by C. Rose et at., Addison-Wesley Publishing Company, Inc., July 1988, which is incorporated herein by reference. With such graphics software, a line can be drawn by simply specifying the coordinates of the beginning and the end of the line, and by specifying the width of the line.

Another preferred tool for implementing the system of the present invention is a view system. Various types of view systems are well known to those skilled in the art. In the present system, the notepad application on the screen 60 can form a first or "root" layer, with the status bar 160, for example, positioned in a second layer "over" the root layer. The various buttons 162 of the status bar 160 are positioned in a third layer "over" the second and root layers. The view system automatically handles "taps" and other gestures of the stylus 110 on the screen 60 by returning information concerning the tap or gesture and any object to which it may be related. U.S. patent application Ser. No. 07/976,970 filed November 16 1992 on behalf of Foster et. al, entitled "Status Bar for Application Windows" and assigned to the assignee of the present invention describes a preferred view system and how to make and use the status bar, and is incorporated herein by reference.

The object oriented programming and view system software makes the implementation of the processes of the present invention less cumbersome than traditional programming techniques. However, the processes of the present invention can also be implemented in alternative fashions, as will be well appreciated by those skilled in the art.

Figure 4A:
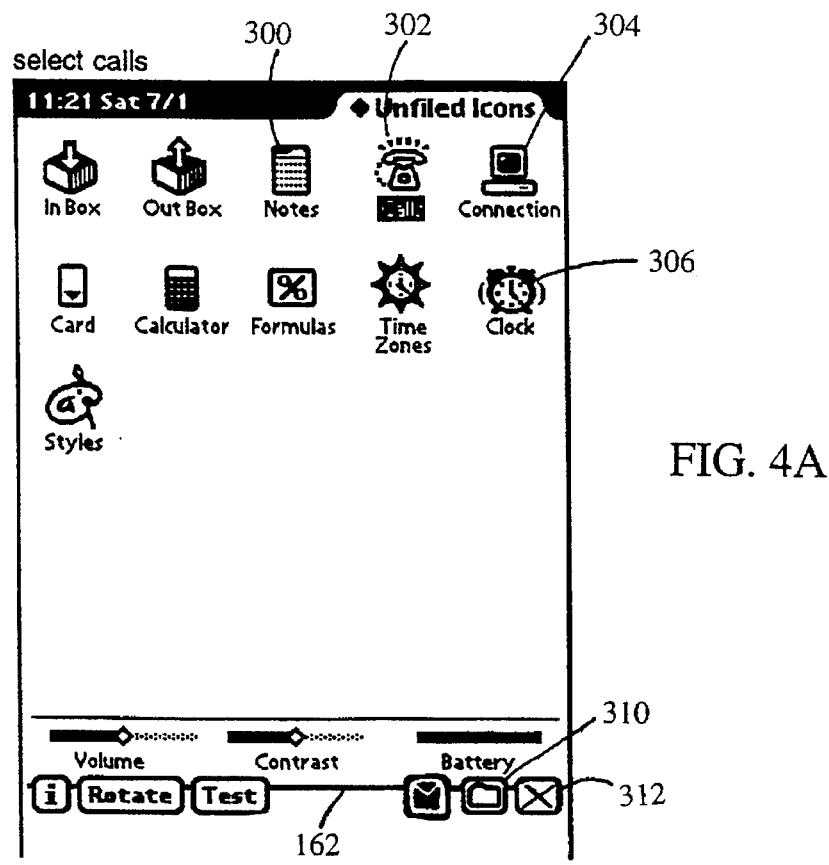
FIGS. 4A–D are screenshots showing, in one embodiment, the steps for making an application program into the backdrop.

FIG. 4A shows a representative display screen of a digital computer, specifically the display screen on tablet 44 of the pen-based computer system of FIG. 2. In FIG. 4A, there are shown user-selectable application icons, among which are application icons 300, 302, 304, and 306. As is known, each application icon is associated with an application program, which may be stored in the computer's memory space or persistent storage.

When an application icon, such as Calls application icon 302, is selected in FIG. 4A, the Calls application program, which is associated with Calls application icon 302, becomes the focus of subsequent user operation. The Calls application program is then said to be selected. The user may, subsequent to its selection, execute the Calls application program, modify its configuration, or perform other tasks associated therewith. In one embodiment, selection is performed by tapping and holding down on the application icon with the stylus. In response, the selected application icon changes in appearance to confirm its status as being selected. However, any other known method of selection and confirmation may be employed since the specific manner in which selection and confirmation are performed is not central to the present invention.

Figure 4B:
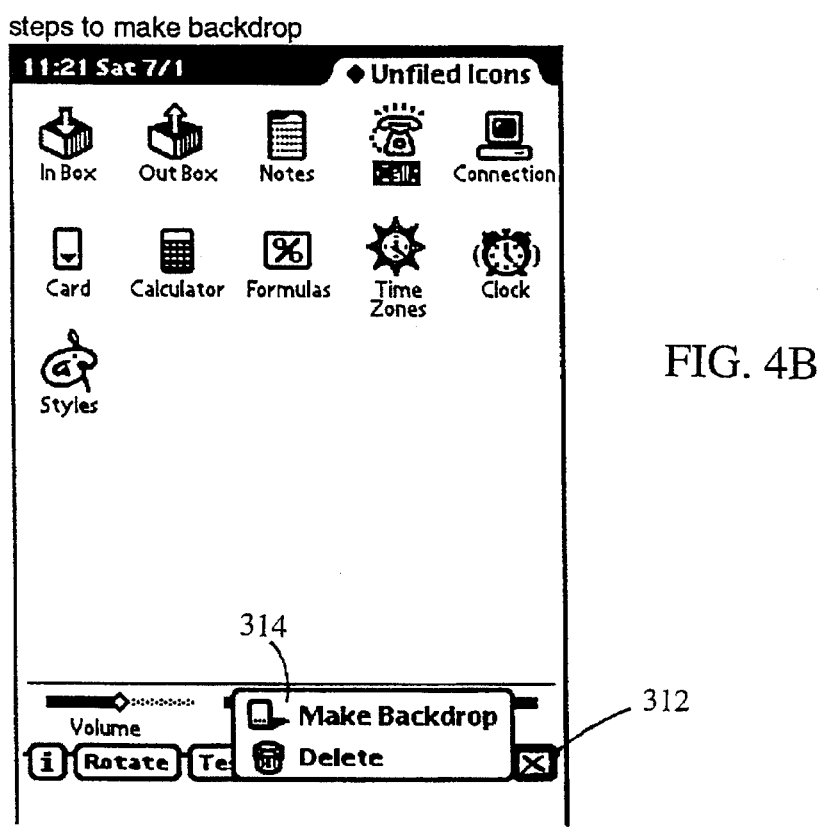

FIG. 4A also shows a plurality of user-selectable icons on status bar 162, of which icons 310 and 312 are of interest. Icon 310 represents a routing icon, which may be utilized, by selecting it in one embodiment, to perform certain actions with respect to the selected application program. In FIG. 4B, routing icon 310 is selected after the selection of Calls application icon 302. The selection of routing icon 310 causes a pop-up menu 314 to appear on the display screen to present actions that the user may take with respect to the selected Calls application program. In the example shown, the user may either make the selected Calls application program the backdrop or delete the selected Calls application icon from the display screen.

Icon 312 represents a close icon and may be used to quit the execution of a currently executing application program. In one embodiment, close icon 312 is provided in the application program window independent of the application program which it controls, i.e., the codes of close icon 312 are "external" to the codes implementing the application program under its control. In this case, the codes implementing the close icon operates independently, but cooperatively, with the application program under its controls and may, in one embodiment, cause the application program to quit execution by sending selected data to the application program. Codes internal to the application program then receive the data and responds by terminating the execution of the application program.

In some application programs, however, there may be provided internal codes for implementing close icons, in which case the codes of the close icons may no longer be considered external to the codes of that application program. As will be shown later, the distinction between a close icon whose implementing codes are external to the application program under its control and one whose implementing codes are not considered external to the application program becomes important when application programs are switched between executing in the backdrop mode and executing in the non-backdrop mode.

Figure 4C:
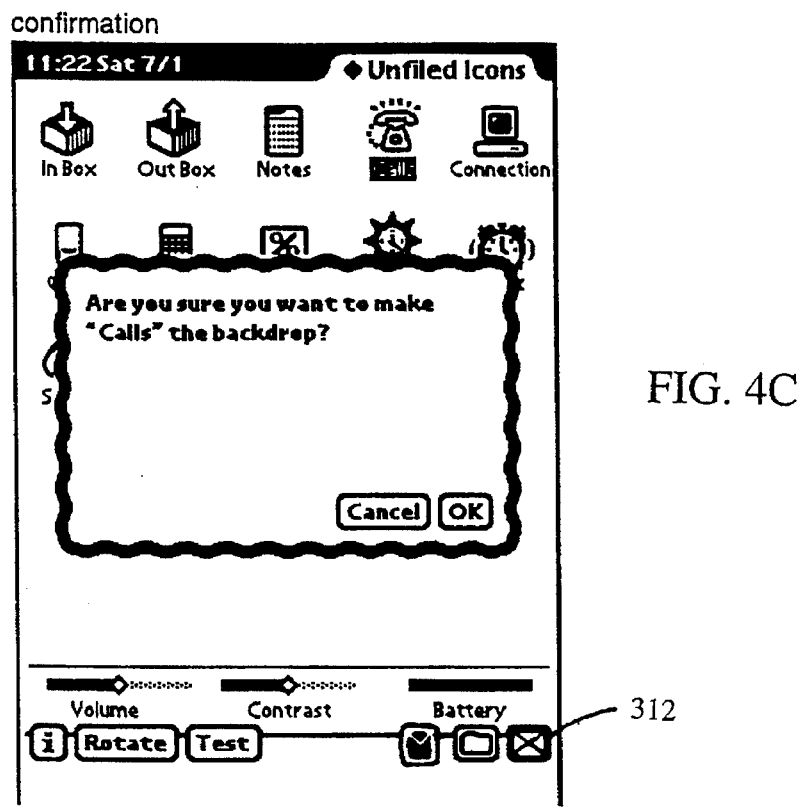

In FIG. 4C, it is assumed that the user has selected, in FIG. 4B, the option to make the selected Calls application program the backdrop. There is optionally provided in one embodiment a step for confirming the user selection. Such confirmation step is implemented by the dialog box of FIG. 4C. Via the dialog box, the user may confirm or cancel the selection as desired.

Figure 4D:
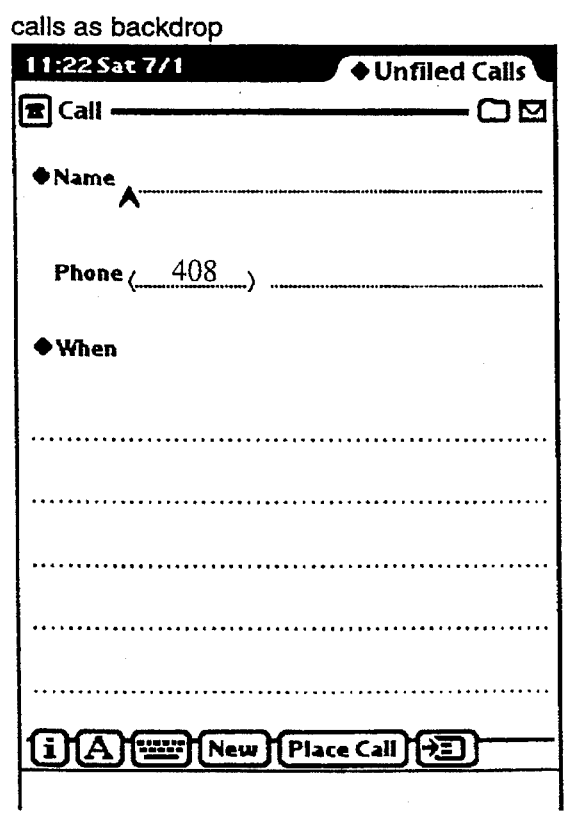

In FIG. 4D, it is assumed that the user has confirmed, in FIG. 4C, the designation of the selected Calls application program as the backdrop. FIG. 4D shows the selected Calls application program executing in the backdrop mode. Note that the close icon 312 has been visually removed in FIG. 4D, thereby preventing a user of the digital computer to issue a command to quit execution of the Calls application program backdrop. As will be discussed later, other steps are also optionally taken to prevent the application program from being inadvertently terminated or hidden from the display screen while the application program executes in the backdrop mode.

When executing in the backdrop mode, the application program may optionally change its user interface. In one embodiment, such as that shown in FIG. 4D, the application program optionally expands its user interface to occupy substantially the entire display screen when executed in the backdrop mode. In other embodiments, however, the application program may remain substantially unchanged with respect to its user interface irrespective of whether the execution mode is backdrop or non-backdrop.

Figure 5:
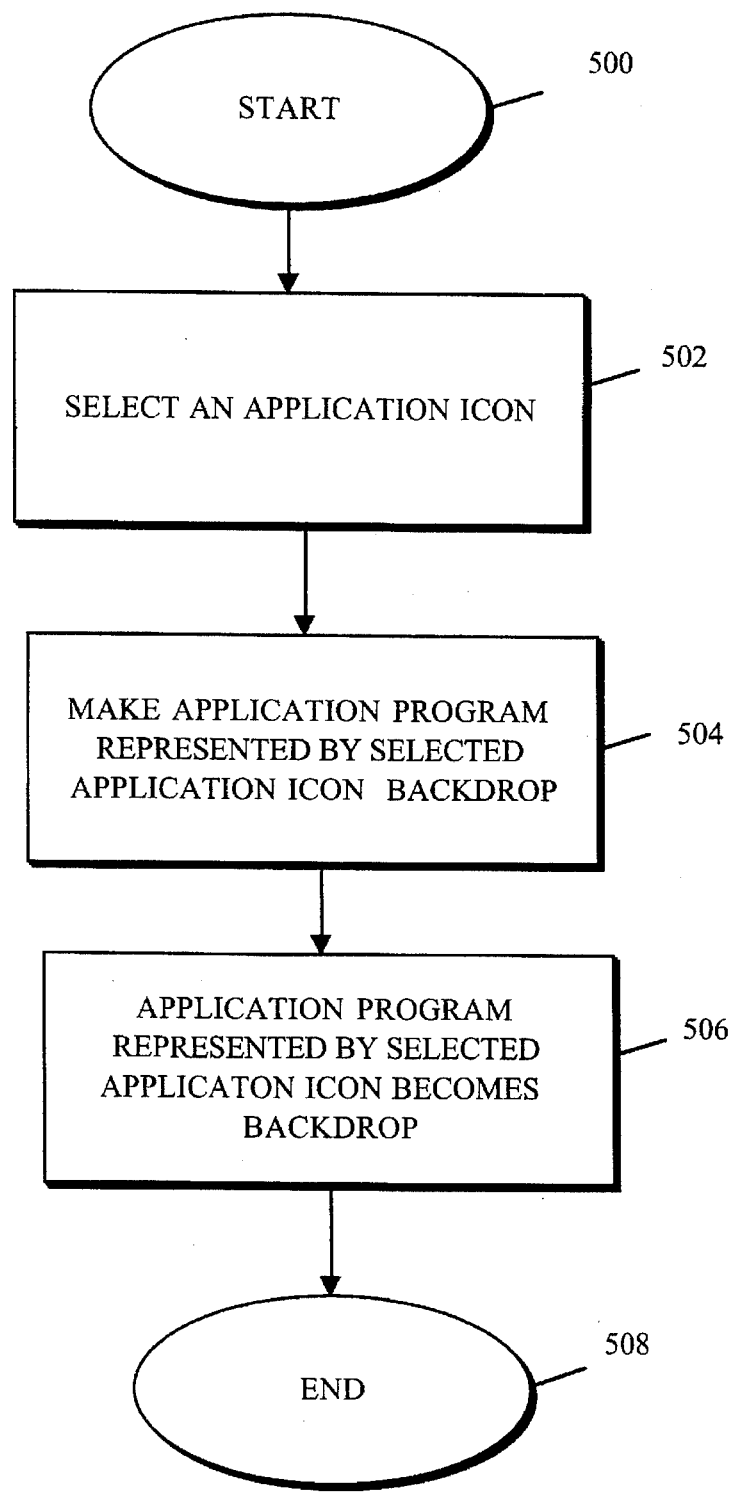
FIG. 5 is a flowchart illustrating, in one embodiment, the steps taken by a user to execute an application program in the backdrop mode.

FIG. 5 is a flowchart illustrating, in one embodiment, the steps taken by a user to execute an application program in the backdrop mode. From block 500 (START), the method proceeds k, block 502 wherein an application icon is selected. The application icon may be selected by clicking, or tapping, on a user-selectable application icon on the display screen, such as on icon 302 of FIG. 4A. Alternatively, the user may select an application icon by picking from a pop-up menu, a pull-down list, by directly entering the name of the application program, or any other method of designating an application program for subsequent operation.

In block 504, the user indicates the desire to make the application program that is represented by the selected application icon the backdrop. As is apparent, blocks 502 and 504 represents the steps for designating an application program for execution in the backdrop mode and may be accomplished by any manner familiar to one skilled in the art. One embodiment of block 504 is explored in greater detail in a subsequent FIG. 6.

In block 506, the application program represented by the selected application icon becomes the backdrop after being so designated by the user (in blocks 502 and 504).

Figure 6:
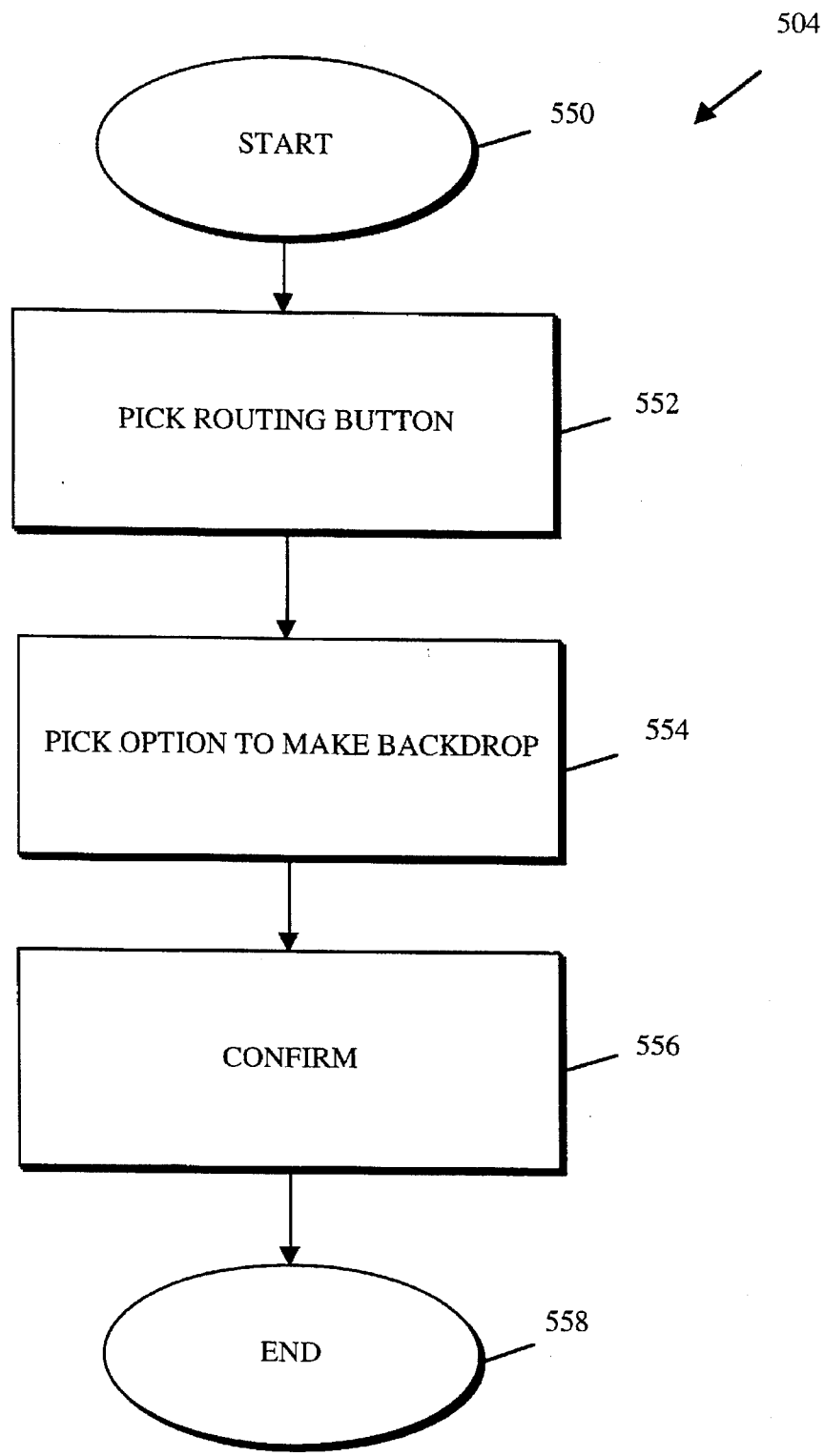
FIG. 6 is a flowchart illustrating, in one embodiment, the steps performed by the user for making for making a selected application program into the backdrop.

FIG. 6 is a flowchart illustrating, in one embodiment, the steps of block 504 of FIG. 5. From block 550 (START), the method proceeds to block 552 wherein the user may pick a routing button. The picking of a routing button causes options which are available with respect to user operation on the selected application program to become available to the user for selection. In one embodiment, block 552 involves clicking, or tapping, on a user-selectable routing icon 310, as is the case of FIGS. 4A-4B. In block 554, the user picks, among the options presented, the option to make the selected application program the backdrop.

Optional block 556 permits the user to confirm the decision to make the selected application the backdrop. As is apparent, blocks 552-556 relate to steps users may take to indicate that they wish to execute the selected application program in the backdrop mode and may be accomplished in any suitable manner other than that explicitly shown in FIGS. 5 and 6. For example, certain operating systems may not include routing buttons but may present a user with options if the user causes some predefined keystroke and/or pointing device entry sequence to be received. In one embodiment, the user may simply keep the pointing device, e.g., stylus 110, pointing in the immediate vicinity of an application icon for a certain time period to cause the options to appear for selection. FIG. 6 ends at block 558.

Figure 7A:
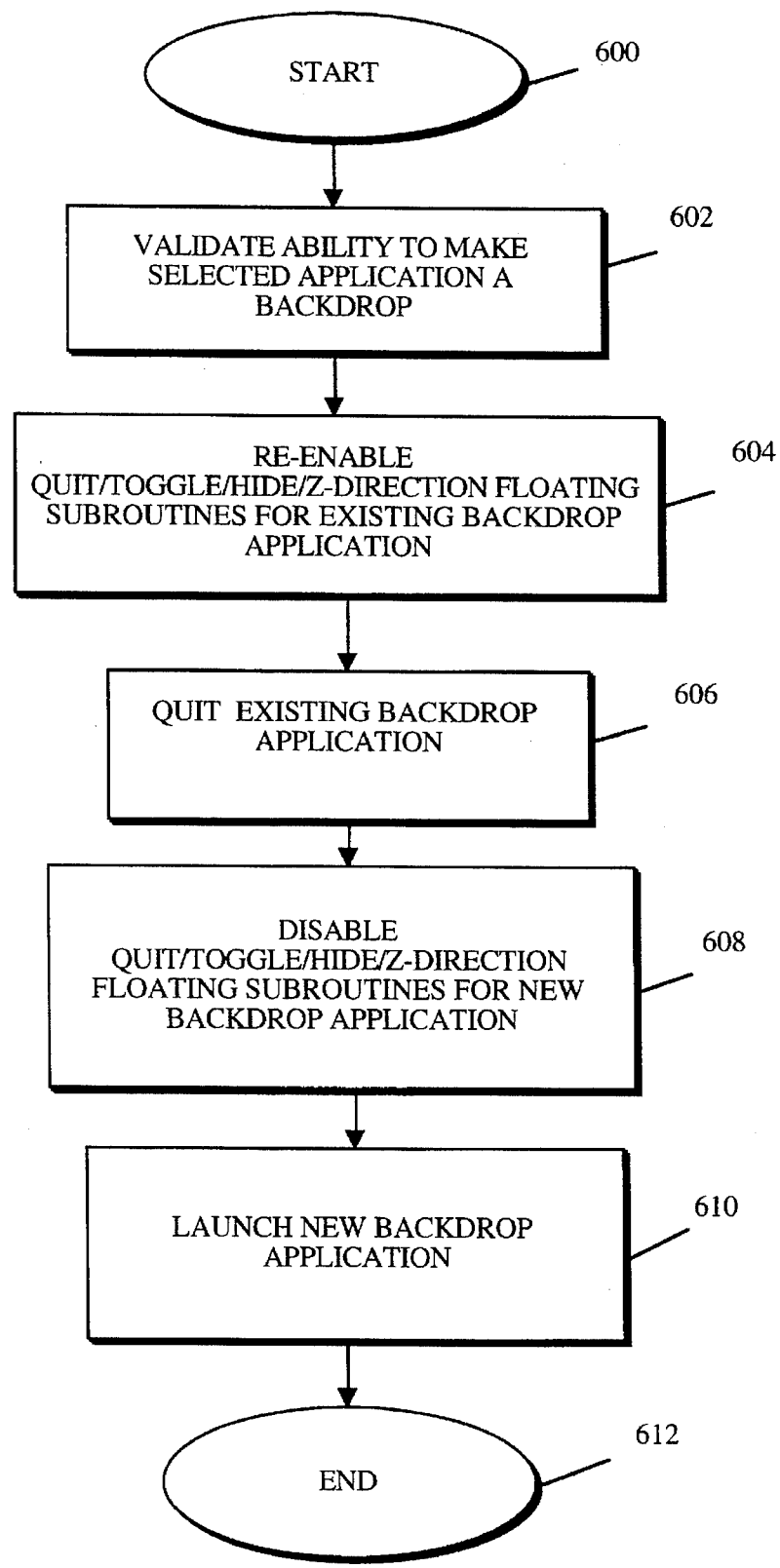
FIG. 7A is a flowchart illustrating the steps taken by one embodiment of the inventive method to allow an application program to execute in the backdrop mode.

FIG. 7A is a flowchart illustrating the steps taken, in one embodiment, by the inventive method to allow an application program to execute in the backdrop mode. In block 602, the method determines whether the selected application program has the ability to execute as the backdrop given current system resources and configuration. By way of example, certain application programs must present their user interfaces either in the portrait mode or in the landscape mode (but not both). If the digital computer currently orients all its application program windows in the landscape mode and the application program designated to execute as the backdrop requires a portrait orientation, that designated application program may not be able to execute at all. In this case, the user is preferably given a warning message. As a further example, certain application programs may require certain system resources for their execution, e.g., adequate memory, network connectivity, the presence of a particular piece of hardware and/or software, and the like. The absence of any required system resources for execution may cause the designated application to fail to execute.

In one embodiment, an application program may have a flag associated with it that indicates whether it can be executed given the current system resources/environment. By checking these flags, it is possible to quickly determine whether it is possible to execute a given program in the backdrop mode in light of the current system resources/environment.

If the ability of the selected application program to become a backdrop is validated in block 602, the method proceeds to block 604, wherein the current application program/backdrop is prepared for exiting its backdrop mode. In one embodiment, this involves re-enabling the standard messaging for the current application program/backdrop, thereby allowing the current application program/backdrop to quit execution if desired. In one embodiment, the current application program/backdrop in fact quits execution (as shown in block 606) after another designated application program is determined to have the ability to execute in the backdrop mode.

In accordance with one aspect of the present invention, an application program executes either in the backdrop mode or the non-backdrop mode depending on how selected data, e.g., messages in the object-oriented programming case, destined for that application program is handled. In accordance with this aspect, when an application program operates in the backdrop mode, selected data affecting that application program's behavior is intercepted while traversing a conceptual shell known as a context frame. In one embodiment, the selected data is handled differently in the two modes due to the use of substitute subroutines in the backdrop mode to intercept the selected data and to handle that selected data in the manner so as to achieve the backdrop effect. The substitute subroutines essentially "preempts" the operation of the original corresponding subroutines in the application program. In one case, the enabling of a substitute subroutine involves the activation of that subroutine in the context frame. For further information regarding context frame in general, reference may be made to a set of publications entitled the Newton Toolkit (1994) from Apple Computer, Inc. of Cupertino, Calif. and particularly to views. The aforementioned Newton Toolkit publication is incorporated herein by reference.

The substitute subroutines, by intercepting the selected data and handling the selected data differently in the backdrop mode, in effect prevent the application program from responding in the manner normally expected of that application program had the selected data been received by that application program (as would be in the non-backdrop case). Note that the codes of the application program itself remain advantageously unchanged in accordance to this aspect of the invention. It is the response of the application program that determines whether it is executing in the backdrop mode or the non-backdrop mode. The fact that selected data never reaches the application program while it executes in the backdrop mode is substantially transparent to that application program. In this manner, any existing application program may advantageously be made into the backdrop without the need to changes codes internal to it. As far as the application program is concerned, it executes normally responsive to the data it actually receives.

Figure 7B:
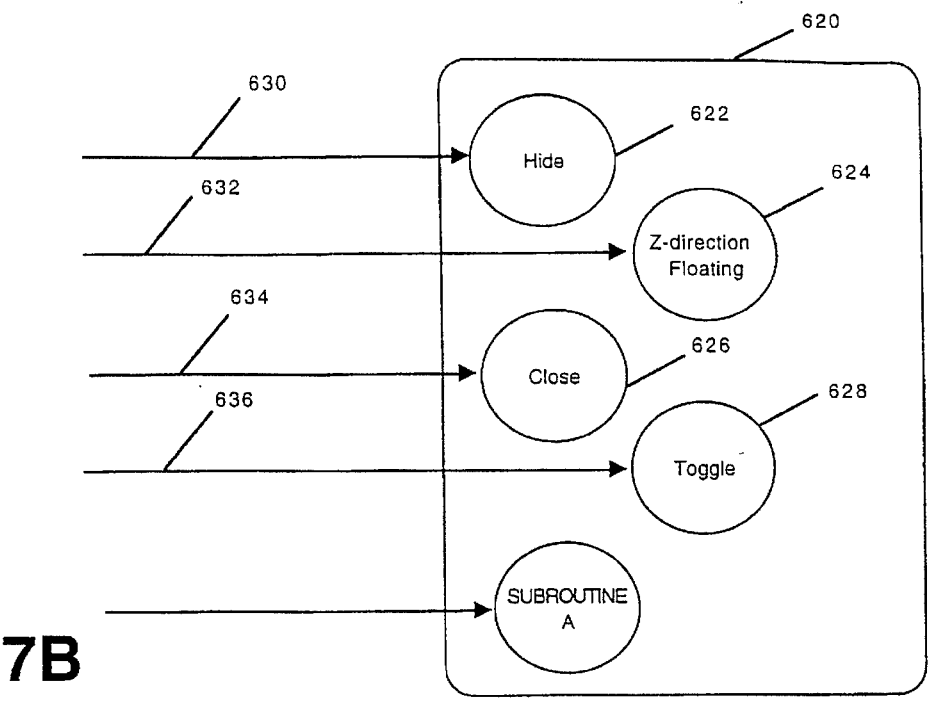
FIGS. 7B–7C represent an application program executing in the non-backdrop mode and backdrop mode respectively to facilitate a discussion of the inventive data intercepting aspect.
Figure 7C:
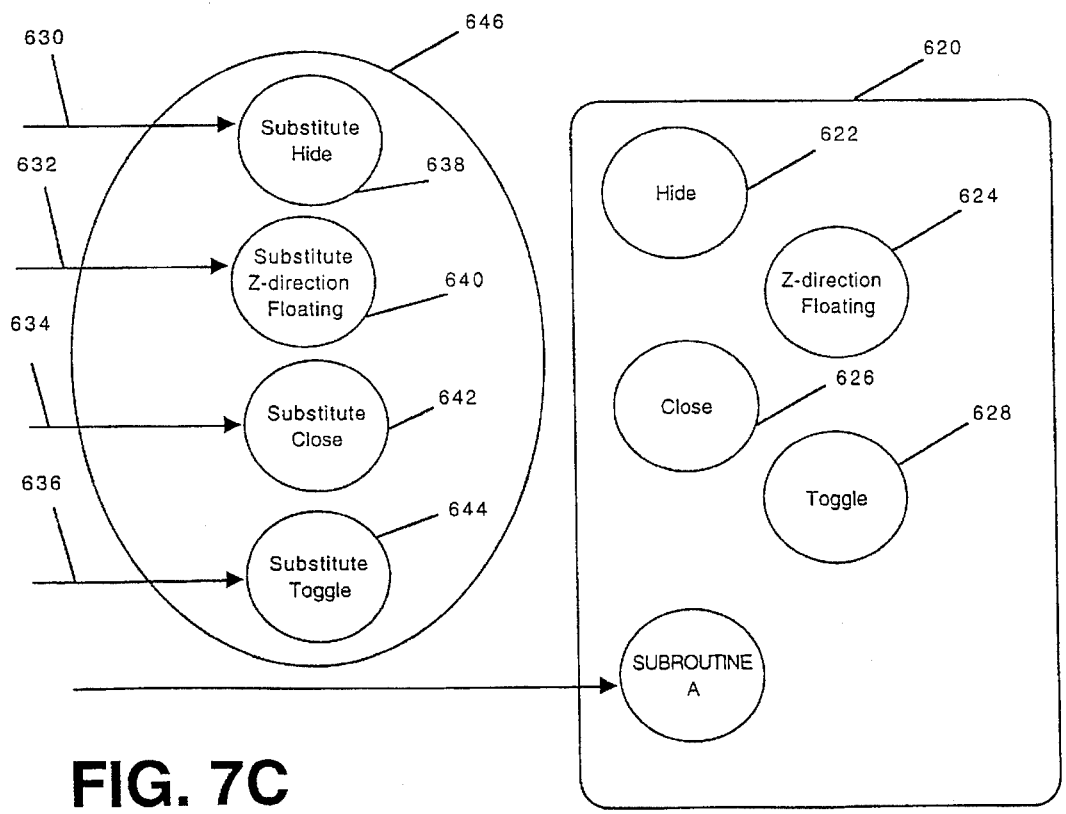

FIGS. 7B and 7C show in a symbolic format the inventive data interception aspect for making an application program the backdrop without requiring changes to internal codes of that application program. FIG. 7B represents an application program executing in the non-backdrop mode. In FIG. 7B, there are shown for illustration purposes hide subroutine 622, z-direction floating subroutine 624, close subroutine 626, and toggle subroutine 628 in application program code block 620 for receiving respective data 630–636. Since the application program implemented by application program code block 620 is executing in the non-backdrop mode in FIG. 7B, these original subroutines receive and handle the selected data 630–636 as expected.

FIG. 7C represents the situation where the application program of application program code block 620 executes as the backdrop. In FIG. 7C, substitute subroutines 638, 640, 642, and 644 are activated in context frame 646. These substitute subroutines intercept data destined for subroutines 622–628 and receive the selected data, e.g., respective data 630–636, directly in order to create the backdrop effect. As is seen in FIG. 7C, no changes are required in the codes of application program code block 620 to allow the application program represented thereby to execute in the backdrop mode.

It is contemplated, however, that certain programs may include codes that alter that application program's behavior while executing in the backdrop mode. By way of example, the Calls application program of FIGS. 4A–4C may have two user interfaces, one of which occupies only part of the display screen when executing in the non-backdrop mode and the other occupying substantially the entire display screen when executing in the backdrop mode.

Having discussed the data interception aspect of the present invention, the remaining steps of FIG. 7A may now be more readily understood. In block 604, the current application program/backdrop is again permitted to receive and respond to selected data, thereby enabling it to exit the backdrop mode. As indicated in block 604, subroutines in the application program that respond to data related to quit, toggle, hide, and z-direction window floating may again receive the selected data related to those functions.

To elaborate, the quit subroutine represents the subroutine that causes the application program to quit execution when it receives data requesting that the execution of the application program be terminated. The toggle subroutine represents the subroutine that causes the application program to toggle between an active mode (executing) and an inactive mode (non-executing) when it receives data requesting the toggling action. The hide subroutine represents the subroutine that causes the application program to be visually removed, but not to terminate execution, from the display screen when it receives data requesting the hide action.

The window floating subroutine represents the subroutine that permits a window implementing the application program to float above, i.e., be in visual foreground in front of, another application program window. If the inventive technique intercepts window floating data destined for the application program/backdrop and always sends to the window floating subroutine in that application program/backdrop substitute window floating data that causes the application program/backdrop window to stay behind other windows in the display screen, the backdrop effect is achieved. This is because the application program/backdrop, upon receiving that substitute window floating data, will cause its window to stay in the visual background relative to other windows.

Once the current application program/backdrop have their standard data receiving mechanism re-enabled, the technique proceeds to optional block 606. Block 606 is shown in FIG. 7A because in one embodiment the current application program/backdrop execution is automatically terminated when it is "deselected" as the backdrop (via the selection and imminent execution of another application program as the new backdrop). The automatic termination feature is highly advantageous in reducing the number of user's entries in certain applications, e.g., when it is desired that the digital computer functions as a dedicated platform for executing a single application program. It is contemplated in an alternative embodiment that the current application program/backdrop merely resumes execution in the non-backdrop mode after being "deselected" as the backdrop.

In block 608, subroutines in the new application program/backdrop that normally handle selected data are disabled. In one embodiment, the disabling step of block 608 involves the activation of substitute subroutines, e.g., by inserting substitute subroutines in the above-mentioned context frame to intercept the selected data. As shown in block 608, the quit, toggle, hide, and z-direction window floating subroutines of the new application program/backdrop are preferably disabled from receiving selected data destined for them. In their place, substitute subroutines intercept the selected data and respond in a manner that allows the new application program/backdrop to achieve the backdrop effects.

In block 610, the new application program/backdrop is launched, i.e., begins execution.

Figure 8:
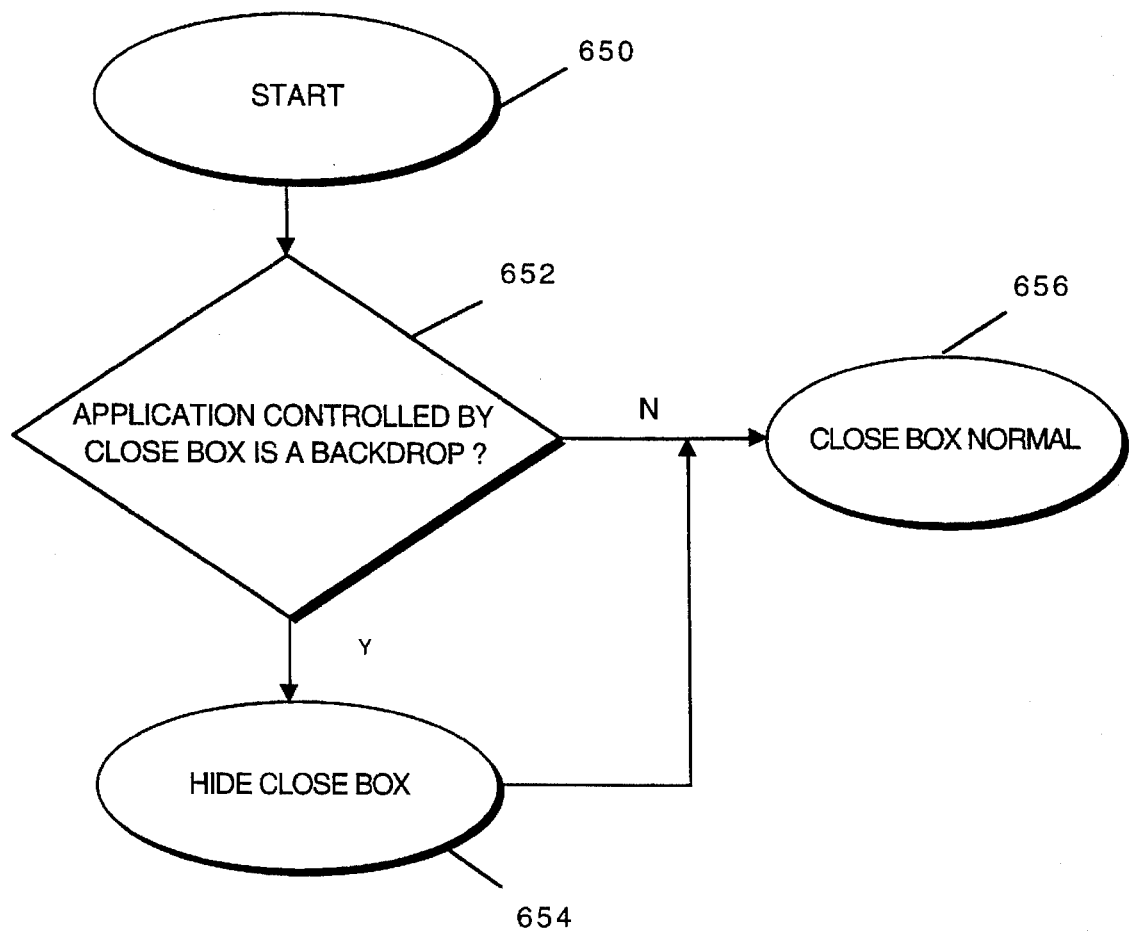
FIG. 8 is a flowchart illustrating, in one embodiment, the steps taken to prevent a user of the computer from issuing a command to quit the execution of the current application program/backdrop.

FIG. 8 is a flowchart illustrating, in one embodiment, the steps taken to disable the close option on the display screen to prevent a user of the digital computer from issuing a command to quit the execution of the current application program/backdrop. The removal of the close option in FIG. 8 enhances usability since, as discussed in connection with FIGS. 7A–7C, data causing the application program/backdrop to quit execution are now intercepted by substitute subroutines and no longer reach the application program to cause the expected termination. If the close option is still present on the display screen, confusion may result since the application program/backdrop will not quit execution even if the user selects this close option.

In one embodiment, the removal of the close option involves reducing the size of the close icon, e.g., close icon 312 of FIGS. 4A–4D. For example, the width of the icon may be reduced, thereby visually diminishing its presence on the display screen. Further, it is contemplated that the remaining icons on the display screen may, in one embodiment, shift their positions to redistribute themselves on the display screen when the close icon is made smaller. It should be appreciated that if the close icon is narrowed to a width of 0, it is effectively removed from the screen visually. In an alternative embodiment, it is contemplated each application program window may have associated with it an invisibility flag, e.g., a Boolean variable. The invisibility flag may be set when the application program window controlled by the close icon implements an application program operating in the backdrop mode. When set, the invisibility flag causes codes implementing the close icon to simply not display the close icon. When the user moves to another window that implements a non-backdrop application program, the invisibility flag is not set, and the close icon is not hidden.

As mentioned earlier, it is preferable in one embodiment that the close icon be implemented by codes that are external to the application program. In other words, it is preferable that the codes for implementing the close icon are not part of the codes that implement the application program. FIG. 8 illustrates the implementation of such an embodiment wherein codes implementing the close icon independently inquire whether the program it currently controls is executing in the backdrop mode (block 652). If the application program indeed executes in the backdrop mode, codes implementing the close icon, independent of the application program codes, visually diminish the close icon from the display screen, e.g., hides the close icon. The hiding of the close icon is shown in block 654.

On the other hand, if the application program does not execute in the backdrop mode, the close icon should be provided on the display screen to permit the user of the digital computer to issue commands to quit execution. In this case, the method of FIG. 7A moves to block 656 wherein the close icon codes execute normally, e.g., to cause the close icon to remain visually available on the display screen for user selection.

Since the codes implementing the hiding of the close icon are external to the codes of the application program and executes independently therefrom, the present invention advantageously allows any existing program to operate in the backdrop mode without requiring modifications to its codes to effect changes in the user interface. For example, no change to the application program codes is required to hide the close icon when the application program changes from operating in the non-backdrop mode to operating in the backdrop mode.

In combination with the inventive data interception aspect, this aspect of the invention advantageously facilitates changes both in the behavior of the application program responsive to selected data sent thereto and in the appearance of its user interface when it operates in the backdrop mode. Most significantly, these changes are implemented without requiring any changes in the codes of the application program to allow it to run in the backdrop mode. It should be appreciated that the ability to effect such changes without requiring modification to codes of the underlying application program or even requiring knowledge of how the underlying program is coded represents a significant advantage of the present invention.

Figure 9:
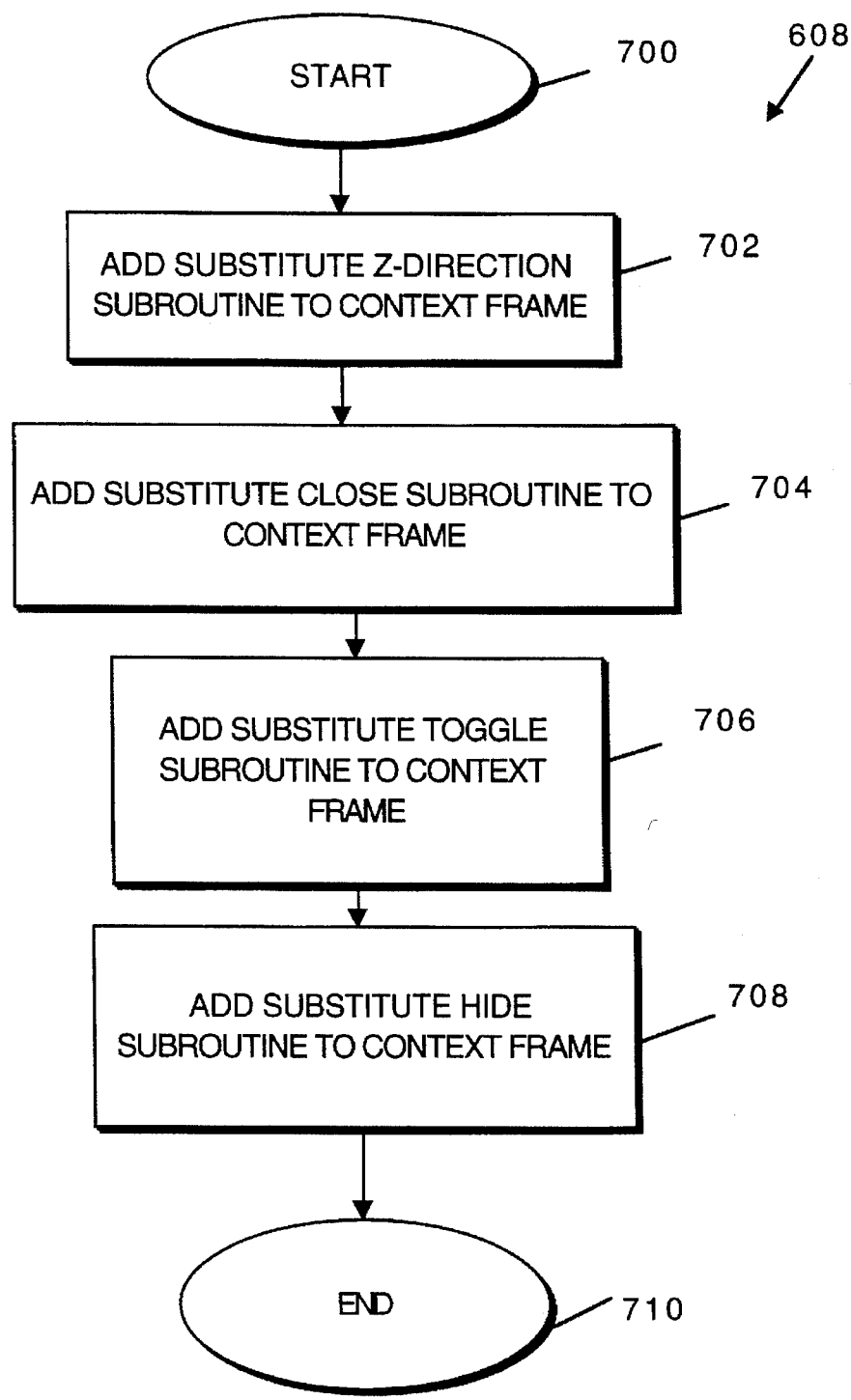
FIG. 9 is a flowchart illustrating in detail the steps involved in endowing a given application program with the ability to execute in the backdrop mode in one embodiment.

FIG. 9 is a flowchart illustrating in detail the steps of block 608 of FIG. 7A wherein a given application program is endowed with the ability to execute in the backdrop mode without requiring changes to its internal codes. In block 702, a substitute z-direction floating window subroutine is added to the context frame to intercept data destined for a corresponding subroutine in the application program codes. In one embodiment, the substitution of z substitute z-direction floating window subroutine may be accomplished by substituting a new z-direction floating window value for the z-direction floating window value that was destined for the original subroutine in the application program codes, thereby allowing the window implementing the application program/backdrop to remain in the visual background behind other windows. Blocks 704, 706, and 708 are blocks wherein substitute close subroutine, toggle subroutine, and hide subroutine are respectively added to the context frame to intercept selected data/messages destined for corresponding subroutines in the application program codes. These substitute subroutines effectively "fools" the application program into behaving as the backdrop.

It should be noted that in some embodiments, not all of blocks 702-708 are required. By selectively adding combinations of blocks 702-708 to the context frame, the user may flexibly modify the behavior of the application program/backdrop to the extent desired. It should be appreciated that although only four subroutines are explicitly shown herein for illustration purposes, other subroutines may be added to appropriately mold the behavior of the application program when it executes as the backdrop. In particular, any subroutine in the application program codes that represents a possible entry point for causing the application program/backdrop to terminate execution is preferably substituted by a substitute subroutine. In this manner, the application program is prevented from being inadvertently terminated when running in the backdrop mode.

Figure 10:
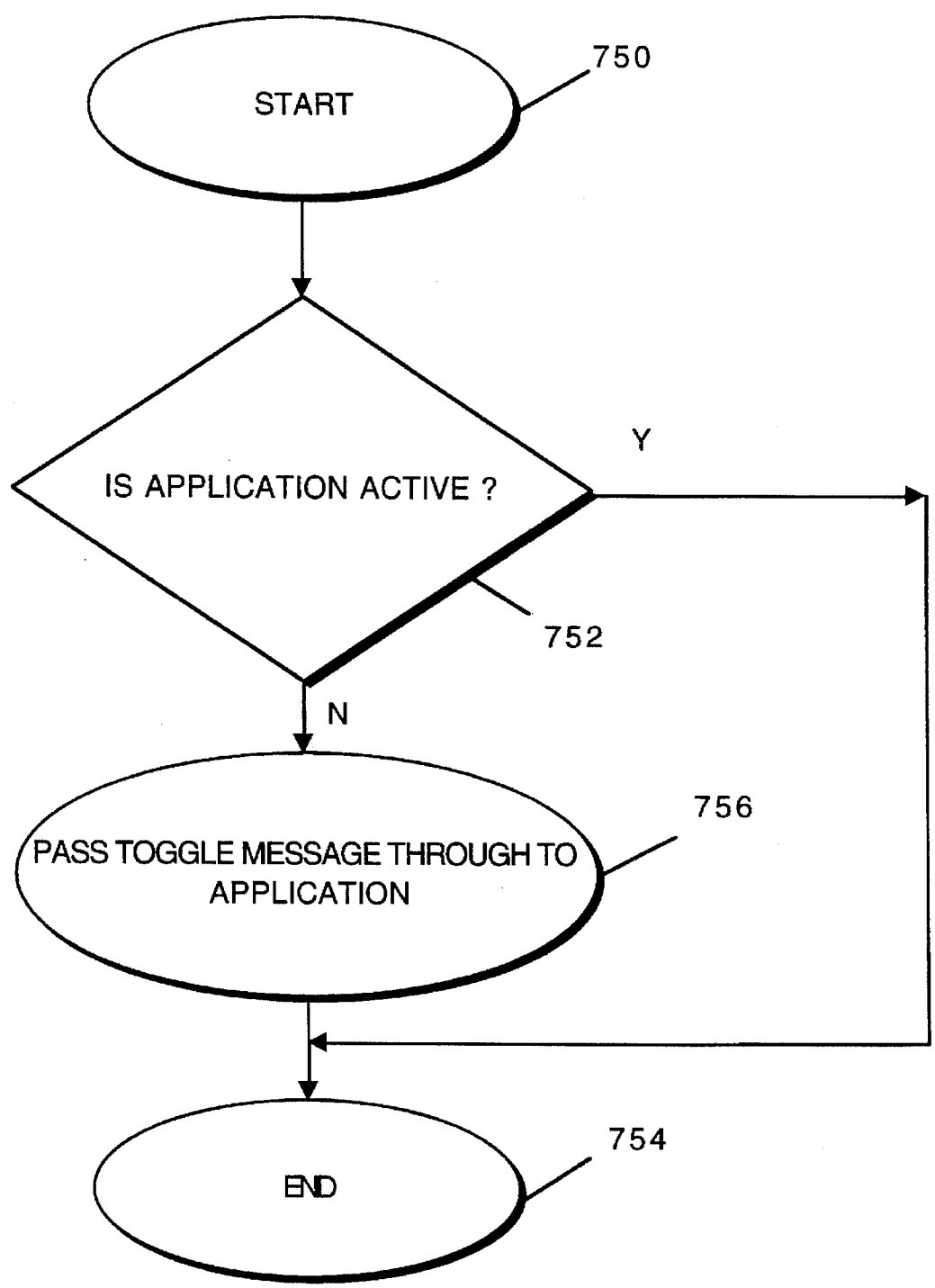
FIG. 10 is a flowchart illustrating the steps taken in one embodiment by the substitute toggle subroutine after it is activated.

FIG. 10 is a flowchart illustrating the steps taken in one embodiment by the substitute toggle subroutine after it is activated, e.g., added to the context frame to affect the behavior of the application program/backdrop. As mentioned previously, the original toggle subroutine represents the subroutine that causes the application program to toggle between an active mode (executing) and an inactive mode (non-executing) when it receives data requesting the toggling action. In block 752, the substitute toggle subroutine inquires whether the application program/backdrop is active (executing). If it is, the substitute toggle subroutine takes no action, i.e., does not toggle the application program/backdrop to an inactive mode (non-executing).

On the other hand, if the application program/backdrop is inactive (not executing), the substitute toggle subroutine proceeds to block 756. The application program/backdrop that the substitute toggle subroutine is supposed to be controlling may not be executing due to a variety of factors, e.g., system glitches, internally generated termination states, and the like.

In block 756, the substitute subroutine allows the toggling data to pass into the application program/backdrop to be received by the original toggle subroutine therein. Note that the substitute toggle subroutine does not, on its own, try to take actions to cause the application program/backdrop to become active. To advantageously enforce encapsulation (a concept whose benefits are familiar to those skilled in the art of programming, particularly in object-oriented programming), the substitute toggle subroutine utilizes the original toggle subroutine in the codes of the application program/backdrop to activate the application program/backdrop. This is important since the original toggle subroutine in the application/program backdrop may perform functions during the process of making the application program/backdrop active, which functions are unknown to developers of the substitute toggle subroutine. Advantageously, this feature of selectively passing selected data to the application program/backdrop allows the substitute subroutines to be implemented without requiring detailed knowledge of how their counterparts in the application programs are implemented. FIG. 10 ends at block 754.

While this invention has been described in terms of several preferred embodiments, there are alterations, permutations, and equivalents which fall within the scope of this invention. It should also be noted that there are many alternative ways of implementing the processes of the present invention. For example, much of the programming can be simplified by using the high-level utilities and data structures mentioned in the preceding specification. In particular, the described frame database system is preferred for simplifying the programming tasks required by the computer implemented processes of the present invention, but there are many other database and graphics systems which can be used to accomplish the same task.

It is therefore intended that the following appended claims be interpreted as including all such alterations, permutations, and equivalents as fall within the true spirit and scope of the present invention.

What is claimed is:

1. In a digital computer having a display screen, a method for executing an application program in a backdrop mode that makes said application program non-removable from said display screen, comprising:

designating said application program for execution in said backdrop mode, said application program being capable of being designated for execution in one of said back-drop mode and a non-backdrop mode;

executing said application program;

intercepting, using substitute subroutines external to said application program, selected data destined for said application program, thereby preventing said application program from responding to said selected data in a manner normally expected of said application program if said application program executes in said non-backdrop mode, said selected data including data for causing said application program to quit execution; and disabling a close option in said display screen to prevent a user of said digital computer from issuing a command to quit execution of said application program while said application program executes in said backdrop mode, wherein said method permits codes in said application program to remain substantially uncharged irrespective of whether said application program executes in said non-backdrop mode or in said backdrop mode.

2. The method of claim 1 wherein said disabling said close option step comprises the step of visually removing a user-selectable close icon from said display screen.

3. The method of claim 1 wherein said user-selectable close icon is controlled by close icon codes that are external to said application program, said close icon codes causing said user-selectable close icon to be visually removed when said close icon codes are informed that said application program operates in said backdrop mode.

4. The method of claim 3 wherein said step of visually removing said user-selectable close icon from said display screen comprises the step of making said user-selectable close icon appear smaller on said display screen.

5. The method claim 4 wherein said user-selectable icon is located on a status bar, said step of making said user-selectable icon appear smaller on said display screen comprises the step of reducing a width of said user-selectable icon, thereby permitting other icons on said status bar to shift their positions relative to a frame of said display screen when said application program is executed in said backdrop mode.

6. The method of claim 1 wherein said selected data comprises data regarding window floating, said data regarding window floating, when intercepted by said substitute subroutines, causes said application program to always remain in said display screen visual background when said application program is executed in said backdrop mode.

7. The method of claim 1 wherein said selected data comprises data for causing said application program to be visually bidden from said display screen, said data for causing said application program to be visually hidden from said display screen, when intercepted by said substitute subroutines, prevents said application program from being visually hidden from said display screen when said application program is executed in said backdrop mode.

8. The method of claim 1 wherein said selected data comprises data for causing said application program to be toggled between being active and being inactive, said data for causing said application program to be toggled, when intercepted by said substitute subroutines, prevents said application program from being toggled between being active and being inactive when said application program is executed in said backdrop mode.

9. The method of claim 1 wherein said step of intercepting comprises the step of enabling stud substitute subroutines in a context frame associated with said application program when said application program is executed in said backdrop mode.

10. The method of claim 1 wherein said step of designating comprises the step of selecting a user-selectable application icon on said display screen, said user-selectable application icon being representative of said application program.

11. A computer program product, comprising a computer usable medium having computer readable code embodied therein for executing an application program in a backdrop mode that makes said application program non-removable from said display screen, the computer program product comprising:

computer readable program code configured to cause a computer to designate said application program for execution in said backdrop mode, said application program being capable of being designated for execution in one of said back-drop mode and a non-backdrop mode;

computer readable program code configured to cause said computer to execute said application program; and computer readable program code configured to cause said computer to intercept, using substitute subroutines external to said application program, selected data destined for said application program, thereby preventing said application program from responding to said selected data in a manner normally expected of said application program if said application program executes in said non-backdrop mode, said selected data including data for causing said application program to quit execution; and computer readable program code configured to cause said computer to disable a close option in said display screen to prevent a riser of said digital computer from issuing a command to quit execution of said application program while said application program executes in said backdrop mode, wherein said method permits codes in said application program to remain substantially unchanged irrespective of whether said application program executes in said non-backdrop mode or in said backdrop mode.

12. The computer program product of claim 11 wherein said computer readable program code configured to cause said computer to disable said close option in said display screen comprises code configured to visually remove a user-selectable close icon from said display screen.

13. The computer program product of claim 11 wherein said user-selectable close icon is controlled by close icon codes that are external to said application program, said close icon codes configured to cause said computer to visually remove said user-selectable close icon when said close icon codes are informed that sad application program operates in said backdrop mode.

14. The computer program product of claim 11 wherein said selected data comprises data regarding window floating, said data regarding window floating, when substituted by substitute data regarding window floating, causes said application program to always remain in said display screen visual background when said application program is executed in said backdrop mode.

15. The computer program product of claim 11 wherein said selected data comprises data for causing said application program to be visually hidden from said display screen, said data for causing said application program to be visually hidden from said display screen, when intercepted by said substitute subroutines, prevents said application program from being visually hidden from said display screen when said application program is executed in said backdrop mode.

16. The computer program product of claim 11 wherein said selected data comprises data for causing said application program to be toggled between being active and being inactive, said data for causing said application program to be toggled, when intercepted by said substitute subroutines, prevents said application program from being toggled between being active and being inactive when said application program is executed in said backdrop mode.

17. A digital computer having a display screen for executing an application program in a backdrop mode that makes said application program non-removable from said display screen, comprising:

means for designating said application program for execution in said backdrop mode, said application program being capable of being designated for execution in one of said back-drop mode and a non-backdrop mode;

means for executing said application program;

means for intercepting, using substitute subroutines external to said application program, selected data destined for said application program, thereby preventing said application program from responding to said selected data in a manner normally expected of said application program if said application program executes in said non-backdrop mode, said selected data including data for causing said application program to quit execution; and means for disabling a close option in said display screen to prevent a user of said digital computer from issuing a command to quit execution of said application program while said application program executes in said backdrop mode, wherein said digital computer permits codes in said application program to remain substantially unchanged irrespective of whether said application program executes in said non-backdrop mode or in said backdrop mode.

\* \* \* \* \*